United States Patent [19]
Hwang et al.

[11] Patent Number: 5,999,178
[45] Date of Patent: Dec. 7, 1999

[54] SELECTION, TYPE MATCHING AND MANIPULATION OF RESOURCE OBJECTS BY A COMPUTER PROGRAM

[75] Inventors: Ching-Fa Hwang; Her-Daw Che, both of Cupertino; Kong Li; Prayoon Phathayakorn, both of San Jose; Thomas Richard Kemp, Menlo Park, all of Calif.

[73] Assignee: NetIQ Corporation, Santa Clara, Calif.

[21] Appl. No.: 08/784,613

[22] Filed: Jan. 21, 1997

[51] Int. Cl.$^6$ ........................................................ G06F 3/14
[52] U.S. Cl. ............................ 345/348; 345/334; 345/356
[58] Field of Search ..................... 345/348, 349, 345/356, 339, 335, 326, 357, 969, 200.33, 200.47, 200.48, 334

[56] References Cited

U.S. PATENT DOCUMENTS

| | | | |
|---|---|---|---|
| 5,140,677 | 8/1992 | Fleming et al. | 345/348 |
| 5,276,789 | 1/1994 | Besaw et al. | 345/440 |
| 5,295,244 | 3/1994 | Dev et al. | 345/357 |
| 5,416,901 | 5/1995 | Torres | 345/348 |
| 5,422,993 | 6/1995 | Fleming | 345/348 |
| 5,432,903 | 7/1995 | Frid-Nielsen | 345/349 |
| 5,491,783 | 2/1996 | Douglas et al. | 345/335 |
| 5,491,795 | 2/1996 | Beaudet et al. | 345/346 |
| 5,557,730 | 9/1996 | Frid-Nielsen | 345/349 |
| 5,638,504 | 6/1997 | Scott et al. | 707/530 |
| 5,638,505 | 6/1997 | Hemenway et al. | 345/348 |
| 5,644,334 | 7/1997 | Jones et al. | 345/419 |
| 5,689,664 | 11/1997 | Narayanan et al. | 345/340 |
| 5,701,137 | 12/1997 | Kiernan et al. | 345/340 |
| 5,715,413 | 2/1998 | Ishai et al. | 345/349 |
| 5,724,532 | 3/1998 | Thomson | 345/326 |
| 5,742,286 | 4/1998 | Kung et al. | 345/349 |
| 5,754,179 | 5/1998 | Hocker et al. | 345/348 |
| 5,764,913 | 6/1998 | Jancke et al. | 395/200.54 |

*Primary Examiner*—Matthew M. Kim
*Assistant Examiner*—Crescelle N. dela Torre
*Attorney, Agent, or Firm*—Skjerven, Morrill, MacPherson Franklin and Friel; Brian D. Ogonawsky; Fabio E. Marino

[57] ABSTRACT

A method is provided for enabling a user to select and manipulate resource objects of a given type by selecting a program of a type compatible with the type of the resource objects via the graphical user interface of a computer system. This is achieved by first controlling a cursor control device of the computer system to drag a program icon onto a resource object icon. Then, a type of the program is compared to a type of the resource object to determine whether the program can manipulate the resource object. If the program can manipulate the resource object, a visual display of the resource object icon is modified to indicate to the user that the program can manipulate the resource object. In response to the visual display, the user has the option of either electing to manipulate the object using the program by dropping the program icon onto the resource object icon, or of terminating the operation by dragging the program icon away from the resource object icon. If the user elects to manipulate the resource object via the program, the program is executed by the computer system. A method is further provided for automatically comparing the type of the program to the type of a second resource object to determine whether the program can manipulate the second resource object, if the type of the program is not compatible with the type of the first resource object. A method is further provided for performing system management on a computer system. Finally, a method is provided for performing system management on a distributed system.

18 Claims, 19 Drawing Sheets

SELECTION, TYPE MATCHING AND MANIPULATION OF RESOURCE OBJECTS BY A COMPUTER PROGRAM

CROSS-REFERENCE TO RELATED APPLICATIONS

This application is related to co-pending application Ser. No. 08/784,563, entitled "Event Signalling In A Foldable Object Tree", filed on Jan. 17, 1997, which is incorporated herein by reference in its entirety.

BACKGROUND OF THE INVENTION

1. Field of the invention

The present invention relates generally to a computer system and, in particular, to a method of selecting, type matching and manipulating resource objects by a computer program using the Graphical User Interface (GUI) portion of a computer system.

2. Description of Related Art

FIG. 1 illustrates the GUI portion of a typical computer system. Computer 100 includes a monitor 110, a keyboard 120 and a mouse 130. One or more windows 140 may be displayed on screen 150 of monitor 110 to allow the user to perform different tasks concurrently. A cursor icon 160, generally, but not necessarily, resembling an arrow is also displayed on screen 150 and is controlled by mouse 130. Generally, when more than one window 140 is displayed on screen 150, the input from keyboard 120 is directed to the foreground window.

Several application programs are executed by the computer system. A user of the computer system can communicate with the application programs executed by the computer system via the GUI portion of the system. As modern computer systems encompass a variety of components, both at the hardware and at the software level, GUIs allow users to control the components of the computer system via an abstract representation of the computer system displayed by the GUI. For example, the user can print a document on a printer attached to the computer by dragging a document icon (i.e. moving the mouse icon over the document icon and then holding down the mouse button while moving the mouse) displayed by the GUI onto a printer icon and dropping (i.e. releasing the mouse button) the document icon onto the printer icon, as shown in FIG. 2. However, if the user attempts to perform an operation via the GUI which is not supported by the computer system (i.e. the user attempts to drop the document icon on an icon representing the computer to which the printer represented by the printer icon is connected), little or no feedback is provided to the user (i.e. nothing happens). As the goal of GUIs is to simplify users interaction with the computer system, there is a need for a method of navigating the GUI which allows users to perform the operations supported by the computer system without requiring familiarity with the details of the interaction of system components.

SUMMARY

The preferred embodiment of the invention provides a method for enabling a user to select and manipulate resource objects of a given type by selecting a program of a type compatible with the type of the resource objects via the graphical user interface of a computer system. This is achieved by first controlling a cursor control device of the computer system to drag a program icon corresponding to a program onto a resource object icon corresponding to a resource object. Then, a type of the program is compared to a type of the resource object to determine whether the program can manipulate the resource object. If the program can manipulate the resource object, a visual display of the resource object icon is modified to indicate to the user that the program can manipulate the resource object. In response to the visual display, the user has the option of either electing to manipulate the object using the program by dropping the program icon onto the resource object icon, or of terminating the operation by dragging the program icon away from the resource object icon. If the user elects to manipulate the resource object via the program, the program is executed by the computer system.

Furthermore, in one embodiment of the invention, if the type of the program is not the same as the type of the resource object, the type of the program is automatically compared to the type of a second resource object to determine whether the program can manipulate the second resource object.

In one embodiment of the invention, a method is further provided for performing system management on a computer system.

Finally, in one embodiment of the invention, a method is provided for performing system management on a distributed system.

BRIEF DESCRIPTION OF THE DRAWINGS

FIGS. 3I–3J shows the operation of FIG. 3C performed after the tree of tree-view pane 320 has been folded by clicking on the Computer-1 icon and the Computer-3 icon.

DESCRIPTION OF PREFERRED EMBODIMENTS

Figure 1:
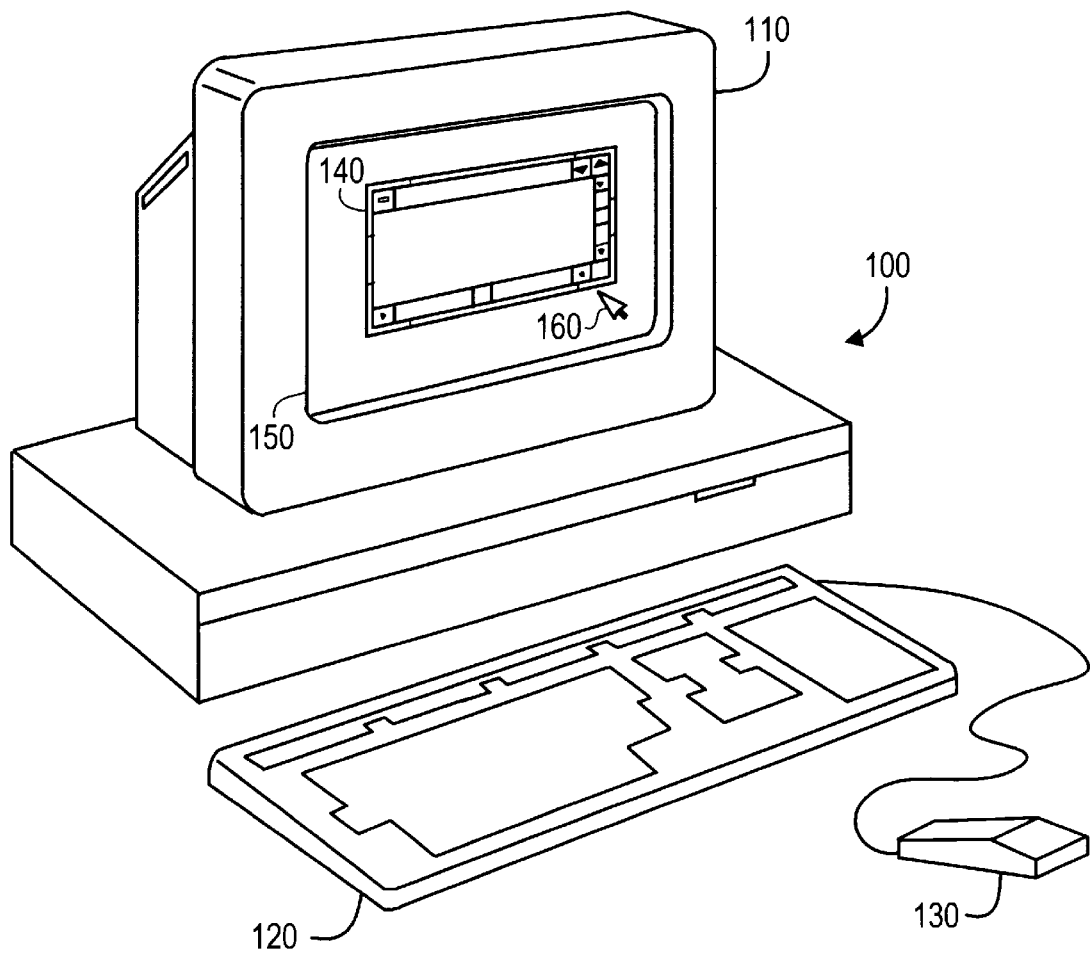
FIG. 1 illustrates the graphical user interface portion of a prior art computer system.
Figure 2:
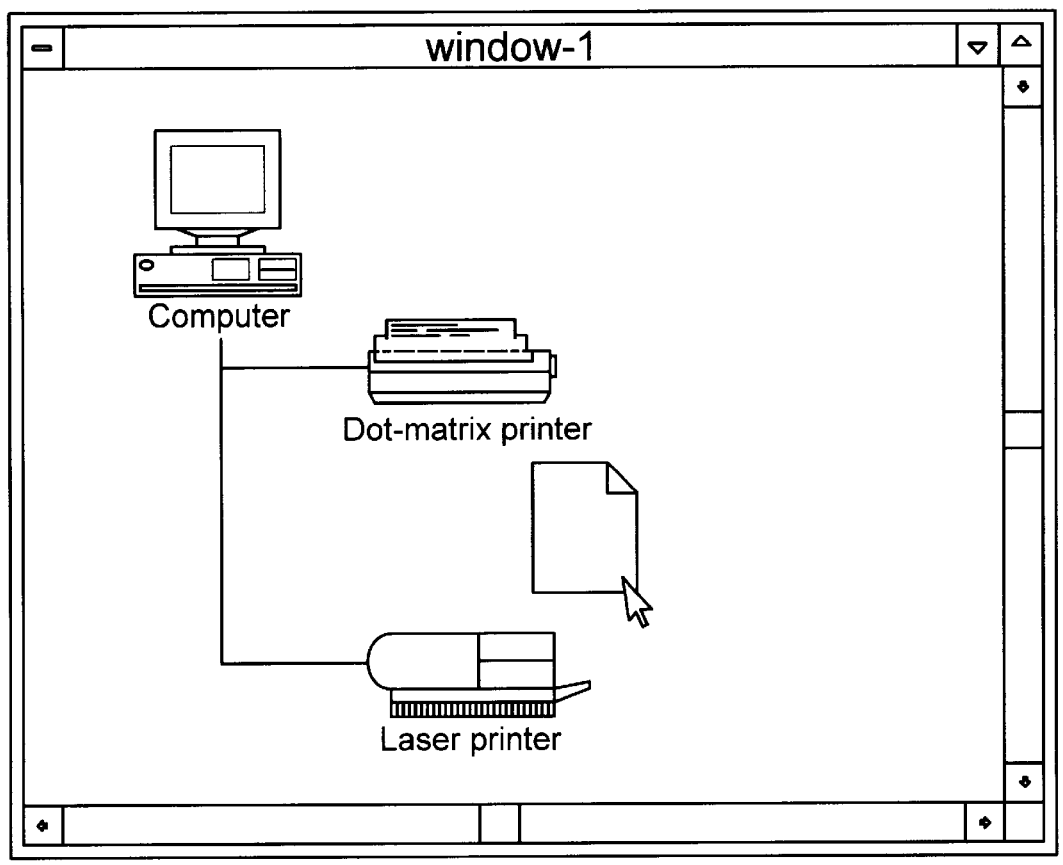
FIG. 2 illustrates a prior art "drag and drop" operation.

The invention allows a user of a computer system to select one of a set of programs represented by icons displayed by a GUI of the computer system to manipulate one of a set of resource objects also represented by icons displayed by the GUI. Each program is programmed to manipulate objects of a specific resource object type, which is also the program's built-in type. In some embodiments, the program can manipulate objects of multiple resource object types. The user is provided with a method for selecting a program to manipulate resource objects, determining which resource objects can be manipulated by the program by comparing the type of the program to the type of the resource objects and selecting which of the resource objects are to be manipulated by the program. No prior knowledge of the type of each program, of the type of each resource object or which resource object has the same type as which program is required for the user to perform these operations. After the user has selected which resource objects are to be manipulated by the program, a source of the program is modified to include a reference to each resource object selected by the user. The source of the program is then converted to executable form to generate an executable program. In an alternative embodiment, references to the resource objects are passed to the program as input parameters, without requiring any modification to or conversion of the program. Finally, the executable program is executed by the computer system to affect the manipulation of the resource objects specified by the user.

A program is given a unique name and written in a standard programming language, such as Virtual Basic or other scripting language, C or C++. Standard programming languages are well known to those skilled in the art and, therefore, they are not further discussed herein. The program has the necessary programming logic to manipulate resource objects of a specific type. A reference to the resource objects to be manipulated can be provided after the program is written and before the program is executed. Once the references to the resource objects are provided, the program can be converted into an executable program by any standard technique known in the art including, but not limited to, compilation, interpretation, etc. Those skilled in the art are familiar with these techniques and therefore they are not further discussed herein.

A resource object has a resource object name and a resource object type. The resource object type of a resource object specifies the properties of the resource object and the kinds of operations that can be performed on the resource object. Resource objects that have similar functions share the same resource object type. Relationships among resource objects can be described in terms of parent-child relationships. A single parent may have multiple children of the same generation.

As used herein, each object in a parent-child relationship maintains a parent type list of the types of its parent objects and a child type list of the types of its child objects. These lists facilitate the type comparison performed when the type of the program is not the same as the type of the resource object selected. As used herein, the terms parent object and child object span over multiple generations (i.e. a parent object of a child object is also a parent object of a child object of the child object).

Figure 7A:
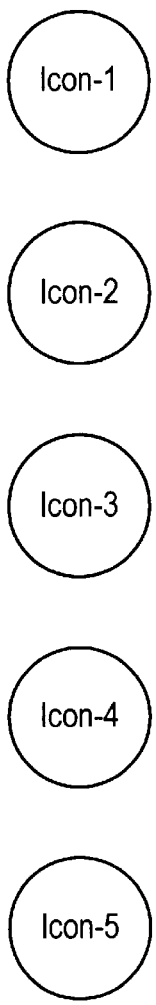
FIGS. 7A–7C show several resource object topologies, according to some embodiments of the invention.
Figure 7B:
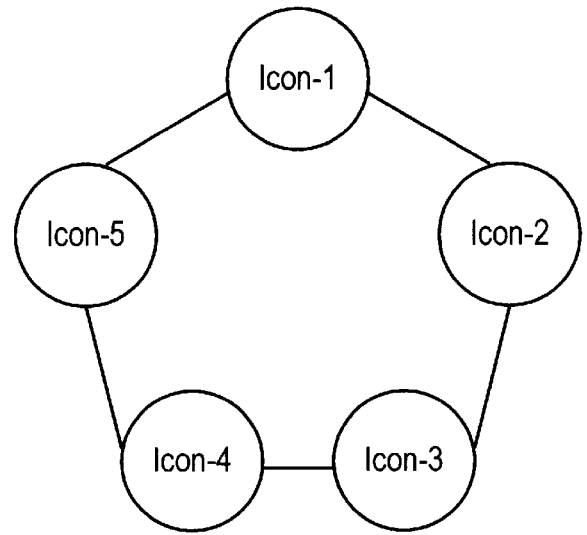
Figure 7C:
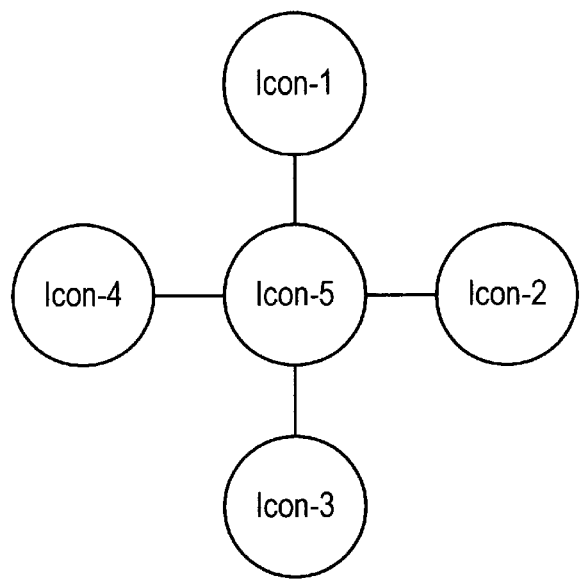

Parent-child relationships among resource objects are represented graphically by an object tree displayed on a screen of computer system. While other topologies, such as a star, a ring or a list (FIGS. 7A–7C) are also within the scope of the present invention, a foldable object tree is described herein as the topology of choice. Each resource object is represented in the tree by an icon, which can also be referred to as a node of the tree. A foldable object tree has several objects at many levels in a hierarchical, parent-child relationship. The tree consists of several resource object icons displayed in a grid having rows and columns. Only one object icon appears in each row. Parent object icons appear to the left and on top of child object icons and are connected to child object icons by vertical and horizontal lines. Each column in the tree represents a hierarchical level. A parent object icon may represent all child object icons at the next hierarchical level (i.e. all the icons in the column to the right of the parent's column). The foldable tree can be folded by clicking on a parent object icon, causing all child object icons of the parent object icon to be hidden from the tree and the empty space to be filled by shifting up the lower rows of the tree. Likewise, a folded tree can be unfolded by clicking on an icon at a node of the tree. If the resource object represented by the icon at the node has one or more child objects, the portion of the tree is redisplayed and rows below the unfolded node are shifted to accommodate the display of the new icons.

According to the preferred embodiment of the invention, an icon displayed by a graphical user interface of a computer system and representing a computer program stored on the computer system can be dragged using a cursor control device, such as a mouse or a trackball, onto an icon representing a resource object of the computer system. Resource objects that can be manipulated by the programs can be any hardware or software resource available on the computer system including, but not limited to, networks, computers, application programs, directories, files, databases, e-mail servers, etc. If one or more resource object types are the same as the program type, a visible indicator is displayed on the screen to alert the user that the program can manipulate the resource object. The user then has the option of dropping the program icon on the resource object icon by releasing the mouse button, causing a source of the program to include a reference to the resource object. The source is then converted to executable form generating an executable program that is executed by the computer system. This operation is illustrated in FIGS. 3A–39.

Figure 3A:
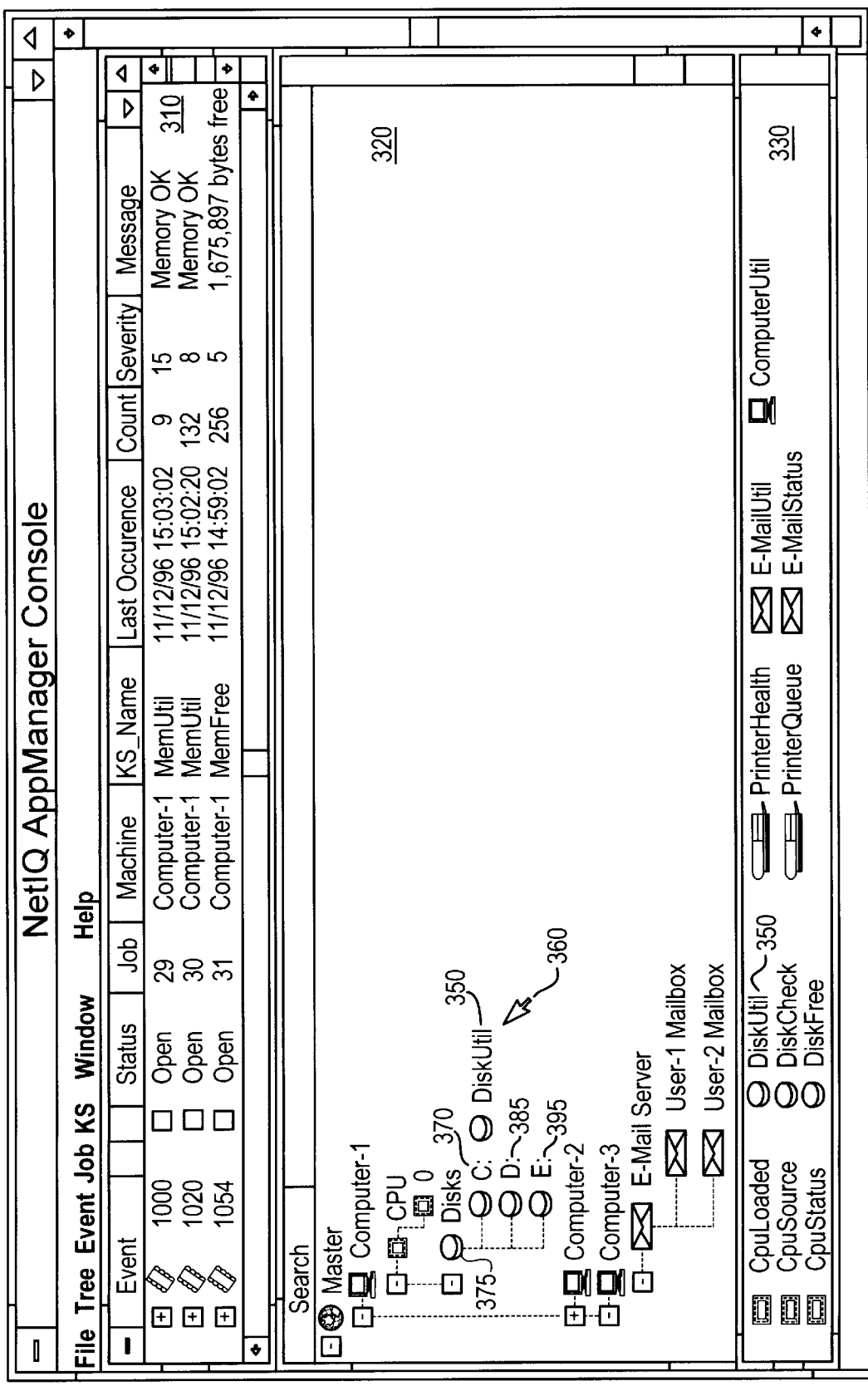
FIG. 3A shows a program icon being dragged onto a resource object icon, according to one embodiment of the present invention.

FIG. 3A shows a window 300 displayed on a screen of the computer system and divided into three panes: list pane 310, tree-view pane 320 and program pane 330. Tree-view pane 320 contains a foldable object tree whose icons represent resource objects of the computer system. Program pane 330, in turn, contains several icons representing programs that can be used to manipulate the resource objects represented by the icons of tree-view pane 320.

In FIG. 3A, DiskUtil icon 350, representing the DiskUtil program, is dragged by a user by moving a cursor 360 over DiskUtil icon 350, pressing the mouse button (not shown) and moving the cursor while holding the mouse button down. DiskUtil Icon 350 moves together with cursor 360 while the mouse button is pressed. When DiskUtil icon 350 is brought in proximity to disk C: icon 370, representing the disk C: resource object, the type of the DiskUtil program is compared to the type of the disk C: resource object.

Figure 3B:
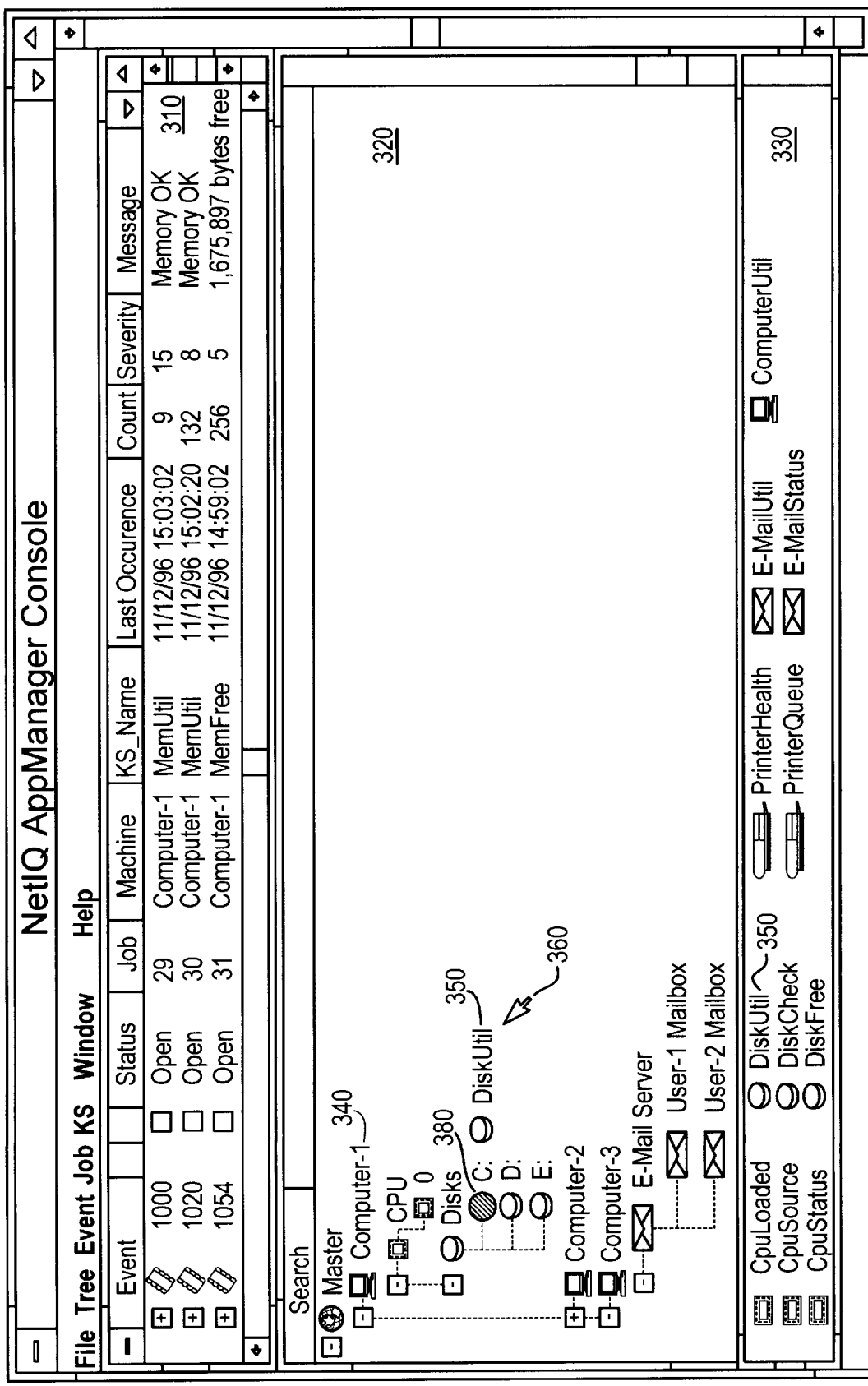
FIG. 3B shows the appearance of a resource object icon being modified to indicate that the program can manipulate the resource object, according to one embodiment of the present invention.

If the type of the program is the same as a type of the resource object, disk C: icon 370 is replaced by On-Target icon 380 to indicate that the DiskUtil program can manipulate the disk C: resource object, as shown in FIG. 3B; otherwise disk C: icon 370 remains unchanged.

Those skilled in the art will appreciate that the appearance of the resource object icon can be altered by any suitable technique known in the art. For example, the resource object icon can be replaced by a different icon, the color of the resource object icon can be modified, or the resource object icon can be displayed intermittently to produce a blinking effect. In some embodiments, the appearance of the cursor icon, rather than the resource object icon is modified to indicate that the program can manipulate the resource object.

As a result, in FIGS. 3A–3B, if DiskUtil icon 350 is dropped onto disk C: icon 370, a source of the DiskUtil program is modified to include a reference to the disk C: resource object, the source is then converted into an executable program, which is executed by the computer system to analyze the status of the disk C: resource.

Furthermore, if the type of the program is not the same as the type of the resource object, the type of the program is compared to the type of other resource objects, which appear in a parent or child relationship with the selected resource object in the foldable object tree of tree-view pane 320. If the type of the program is the same as the type of one the resource objects, the user is alerted that the program can manipulate the resource objects, as shown in FIGS. 3C–3E.

Figure 3C:
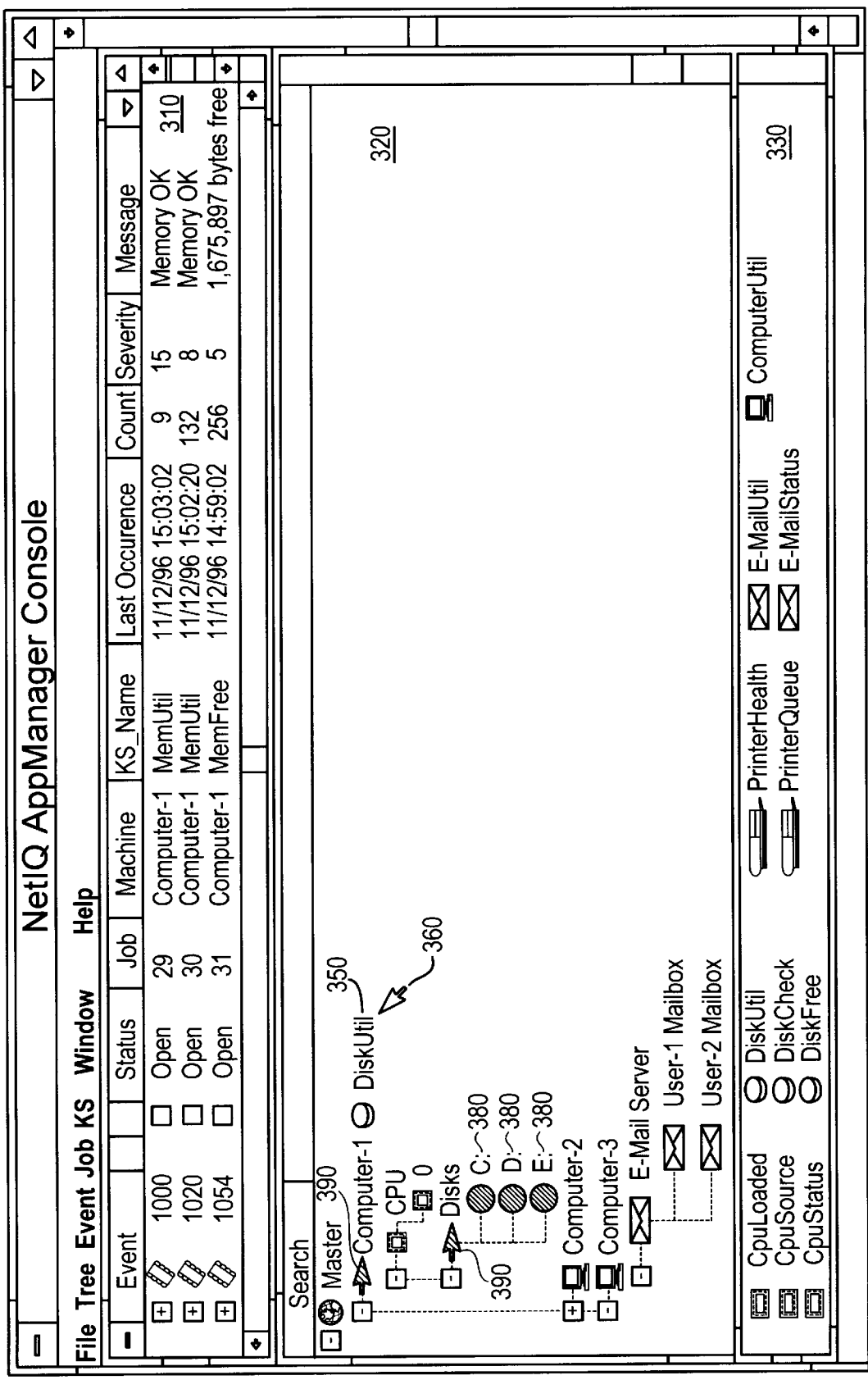
FIG. 3C shows a program icon being dragged onto a resource object icon, the appearance of the resource object icon and the appearance of the icons of its child resource objects being modified to indicate that the program can manipulate the child resource objects, according to one embodiment of the present invention.

In FIG. 3C, DiskUtil icon 350 is dragged onto Computer-1 icon 340 (FIG. 3B) and the type of the DiskUtil program is compared to the type of the Computer-1 resource object. Since the type of the DiskUtil program is not the same as any type of the Computer-1 resource object, the type of the program is compared to the type of the child resource objects of the Computer-1 resource object stored in the child type list of the Computer-1 resource object. Three child resource objects of the Computer-1 resource object have the same type as the DiskUtil program, namely the disk C: resource object, the disk D: resource object, and the disk E: resource object, represented by icons 370, 385 and 395, respectively. Computer-1 icon 340 (FIG. 3B) and Disks icon 375 (FIG. 3A) are thus replaced by Point-to-Child icon 390 to indicate that the program can manipulate one or more of their child resource objects. In addition, icons 370, 385 and 395 are replaced by On-Target icon 380 indicating that the program can manipulate the resource objects represented by these icons.

Thus, if the user drops DiskUtil icon 350 onto Computer-1 icon 340, references to the disk C:, disk D: and disk E: resource objects are added to a source of the DiskUtil program, and an executable program is generated and executed by the computer system.

Figure 3D:
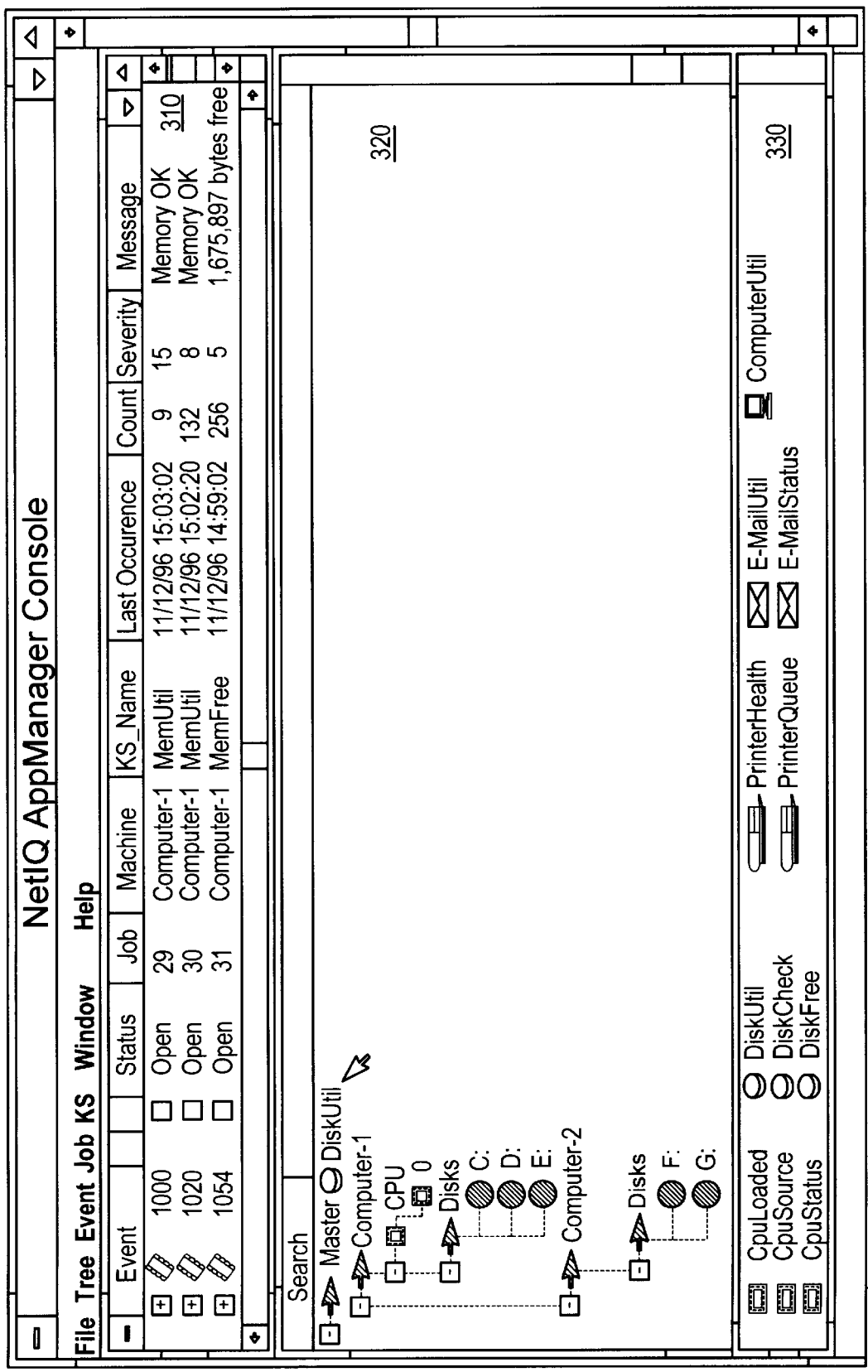
FIG. 3D shows a program icon being dragged onto a network resource object icon, the appearance of the network resource object icon and of its child resource object icons being modified to indicate that the program can manipulate some of the child resource objects, according to one embodiment of the present invention.
Figure 3E:
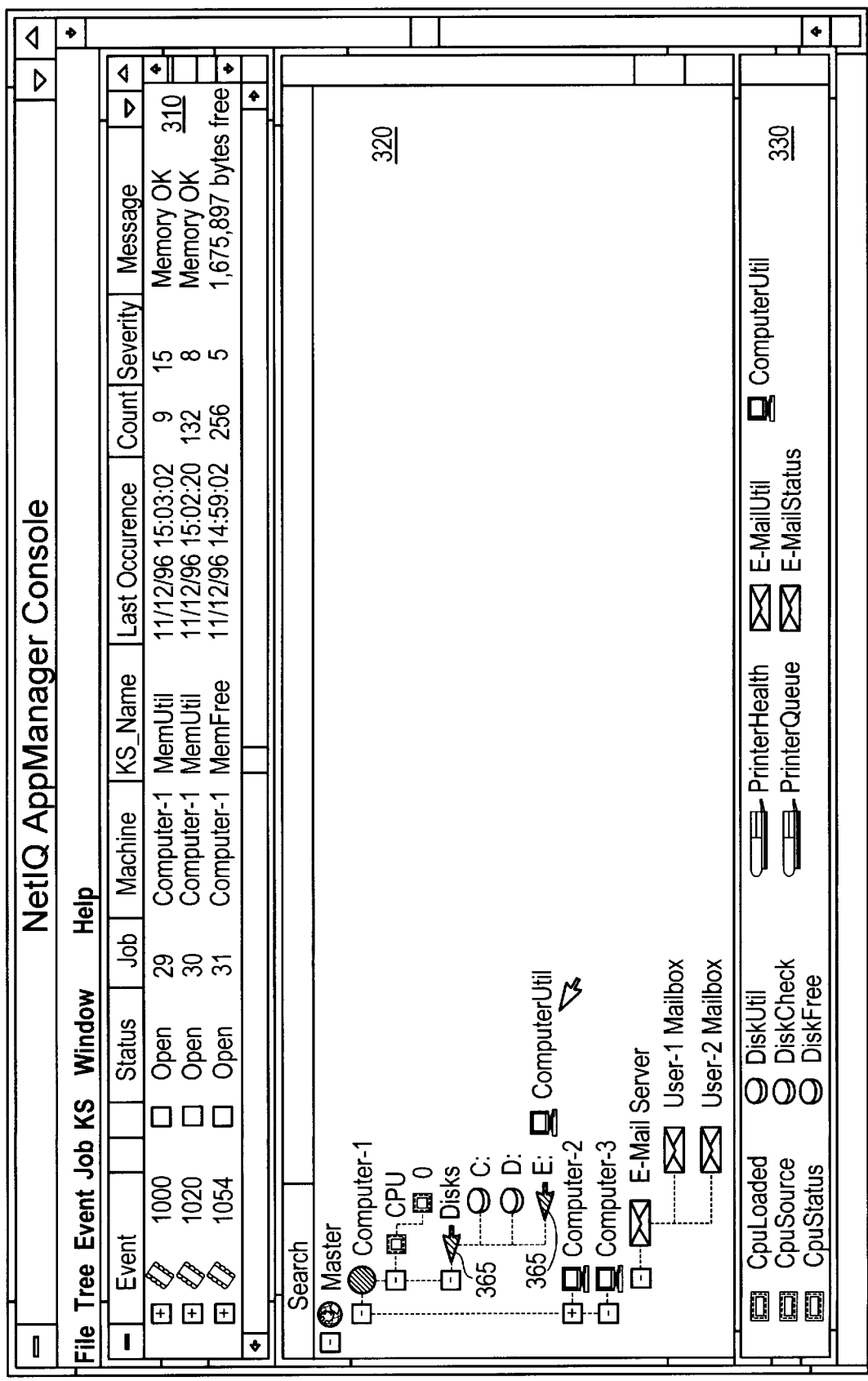
FIG. 3E shows a program icon being dragged onto a resource object icon, the appearance of the resource object icon and of its parent resource object icons being modified to indicate that the program can manipulate one of the parent resource objects, according to one embodiment of the present invention.

FIG. 3D illustrates an operation similar to the operation of FIG. 3C, except that the program icon is dragged onto an icon representing the top level of a distributed system and resource objects located on different computers have the same type as the program corresponding to the program icon. As explained more fully infra, since resource objects that match the program type reside on different computers, when the user drops the program icon onto the resource object icon multiple copies of the program are modified and executed, one for each computer.

FIG. 3E illustrates an operation similar to the operation of FIG. 3C except that the resource object that has the same type as the program is a child (rather than a parent of the resource object) onto which the program object is dragged. In this case, Point-to-Parent icon 365, rather than Point-to-Child icon 390, is used to indicate that the program can manipulate a parent resource object of the selected resource object.

Figure 3F:
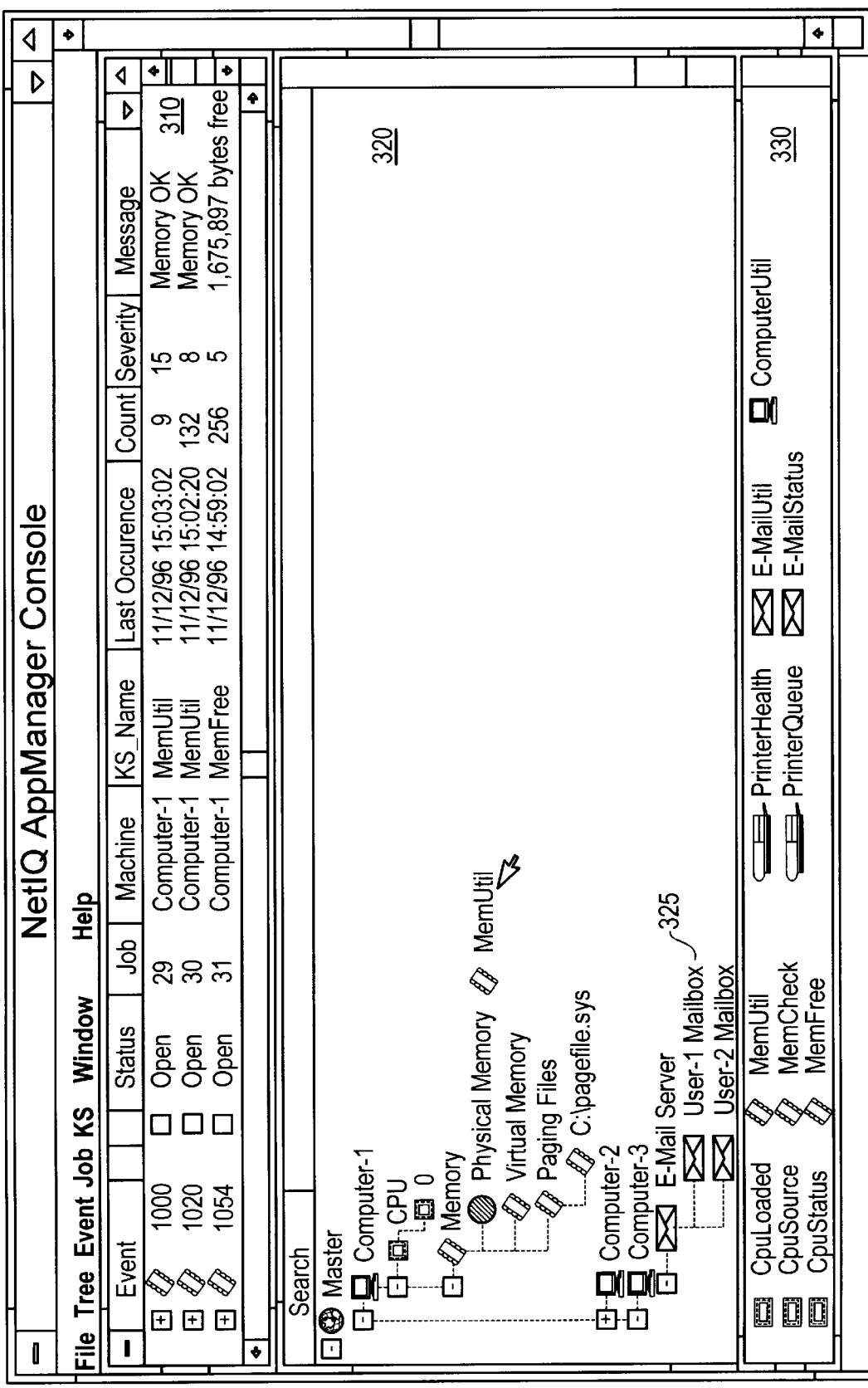
FIG. 3F shows a program icon corresponding to program having more than one type being dragged onto a resource object icon, the appearance of the resource object icon being modified to indicate that the program can manipulate the resource object, according to one embodiment of the present invention.
Figure 3G:
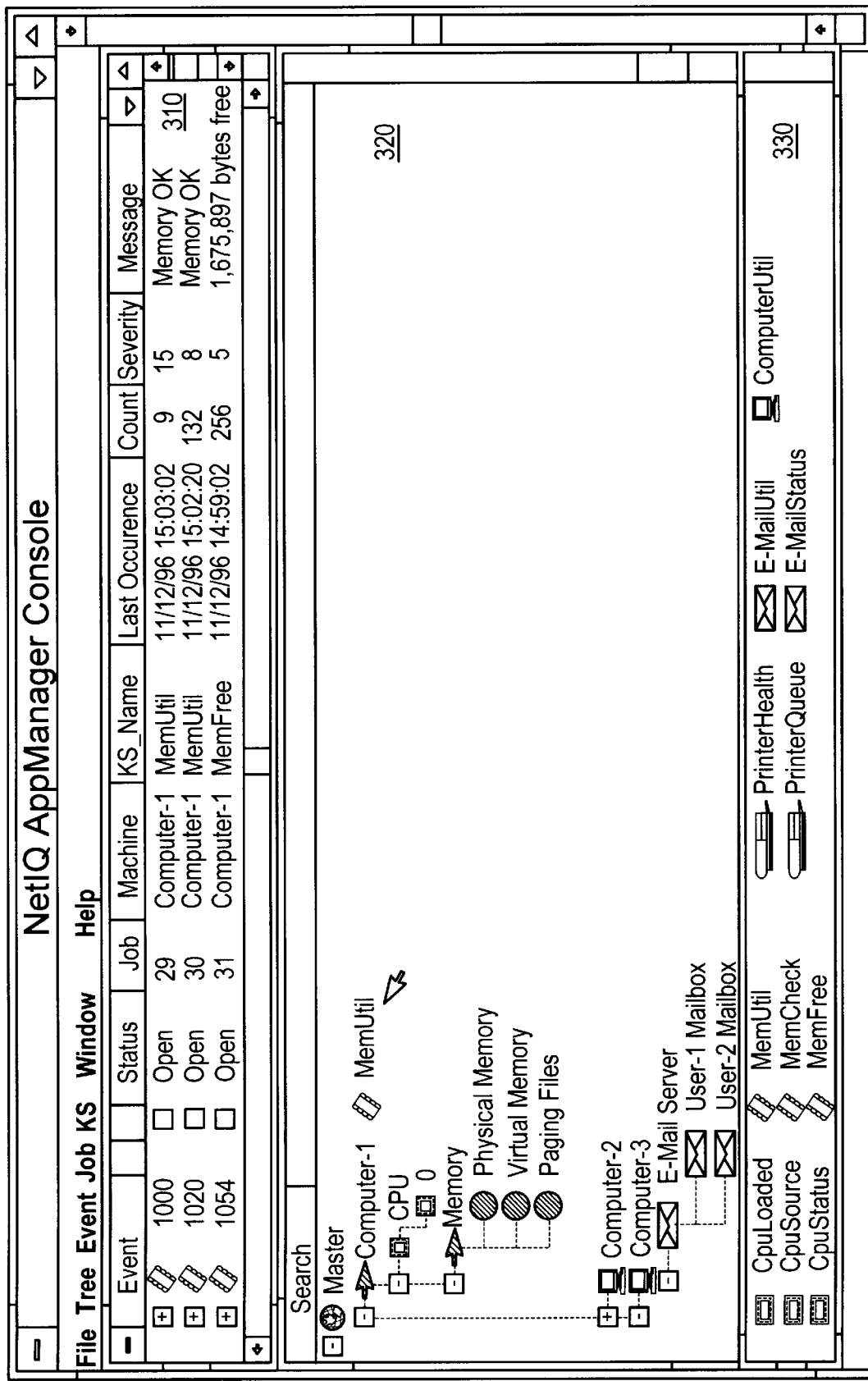
FIG. 3G shows a program icon corresponding to program having more than one type being dragged onto a resource object icon, the appearance of the resource object icon and of its child resource object icons being modified to indicate that the program can manipulate some of the child resource objects, according to one embodiment of the present invention.

FIGS. 3F and 3G illustrate operations similar to those of FIGS. 3B and 3C, respectively, except that the MemUtil program, which can manipulate resource objects having different types, is applied to the memory system resource objects having different resource object types, such as physical memory, virtual memory and paging files.

Figure 3H:
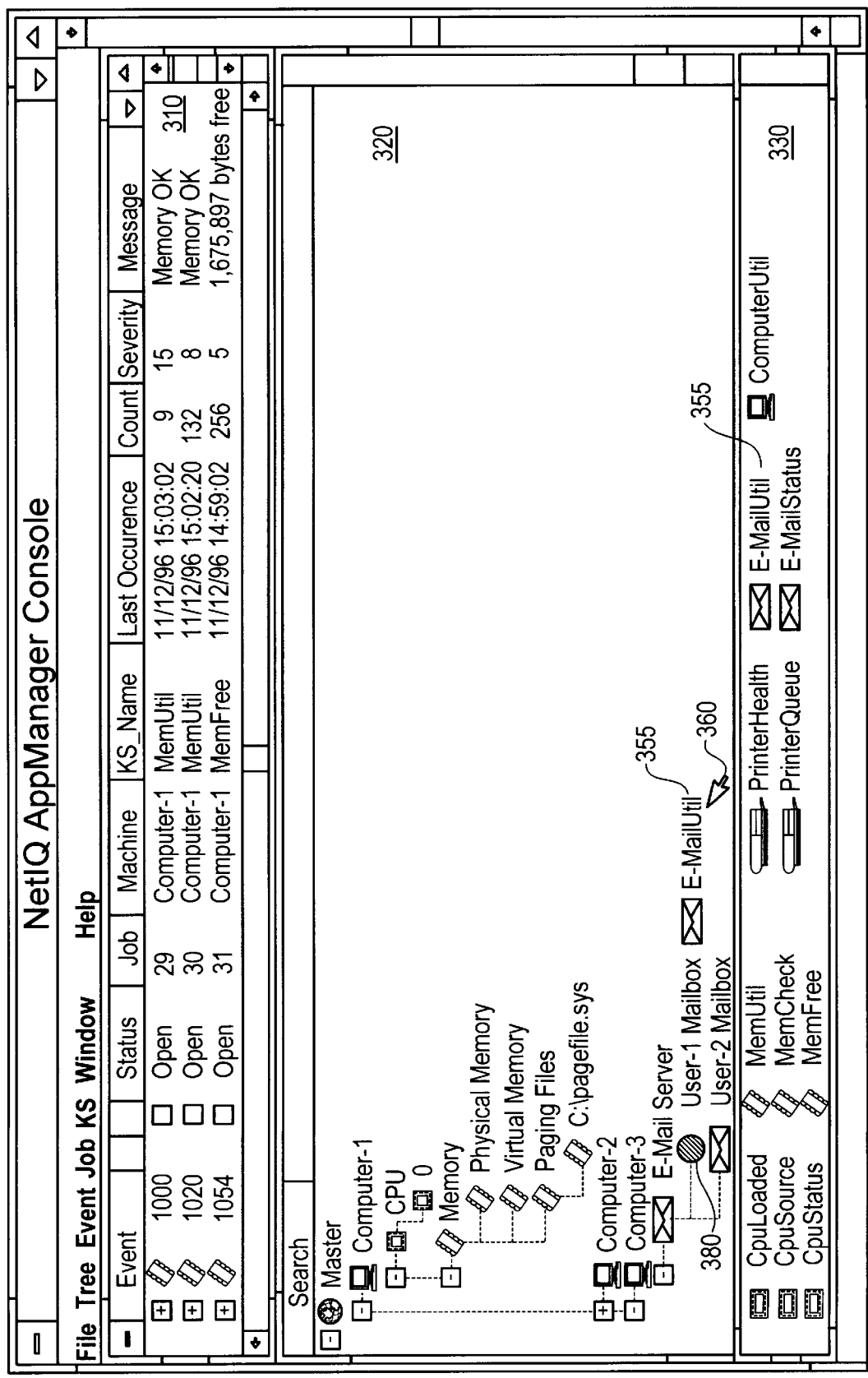
FIG. 3H shows the appearance of a different resource object icon being modified to indicate that a different program can manipulate the resource object, according to one embodiment of the present invention.
Figure 31:
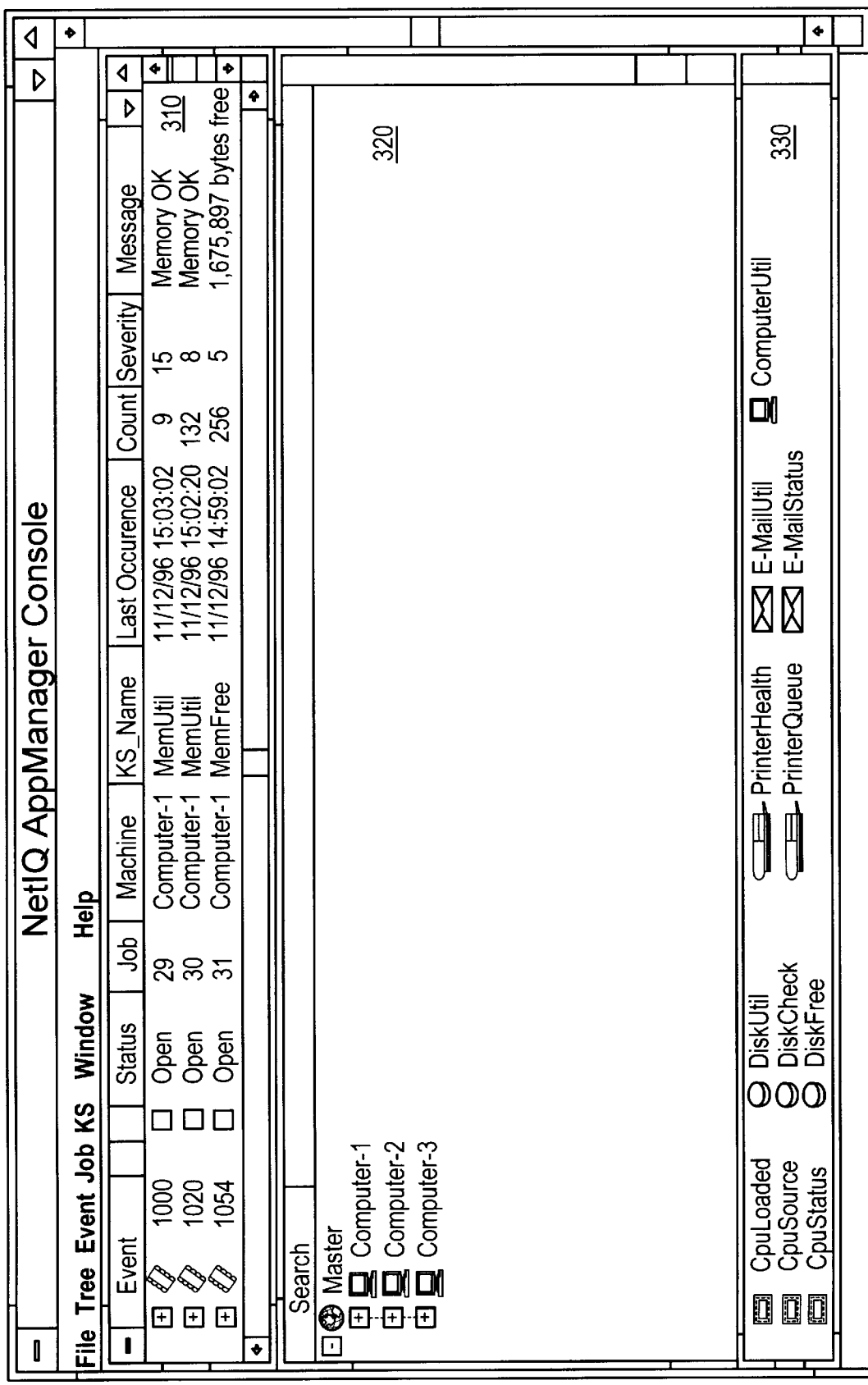

While the operations described in FIGS. 3A–3G describe manipulating resource objects of the computer system via the DiskUtil or the MemUtil program, the method of the invention can be applied to other programs and resource objects, not limited to the programs and resource objects depicted in FIGS. 3A–3G, such as e-mail, internet and database servers. For example, an E-MailUtil program, represented by E-MailUtil 355, can be used to manipulate a user mailbox, represented by User-1 Mailbox icon 325 (FIG. 3F), as shown in FIG. 3H.

Figure 3J:
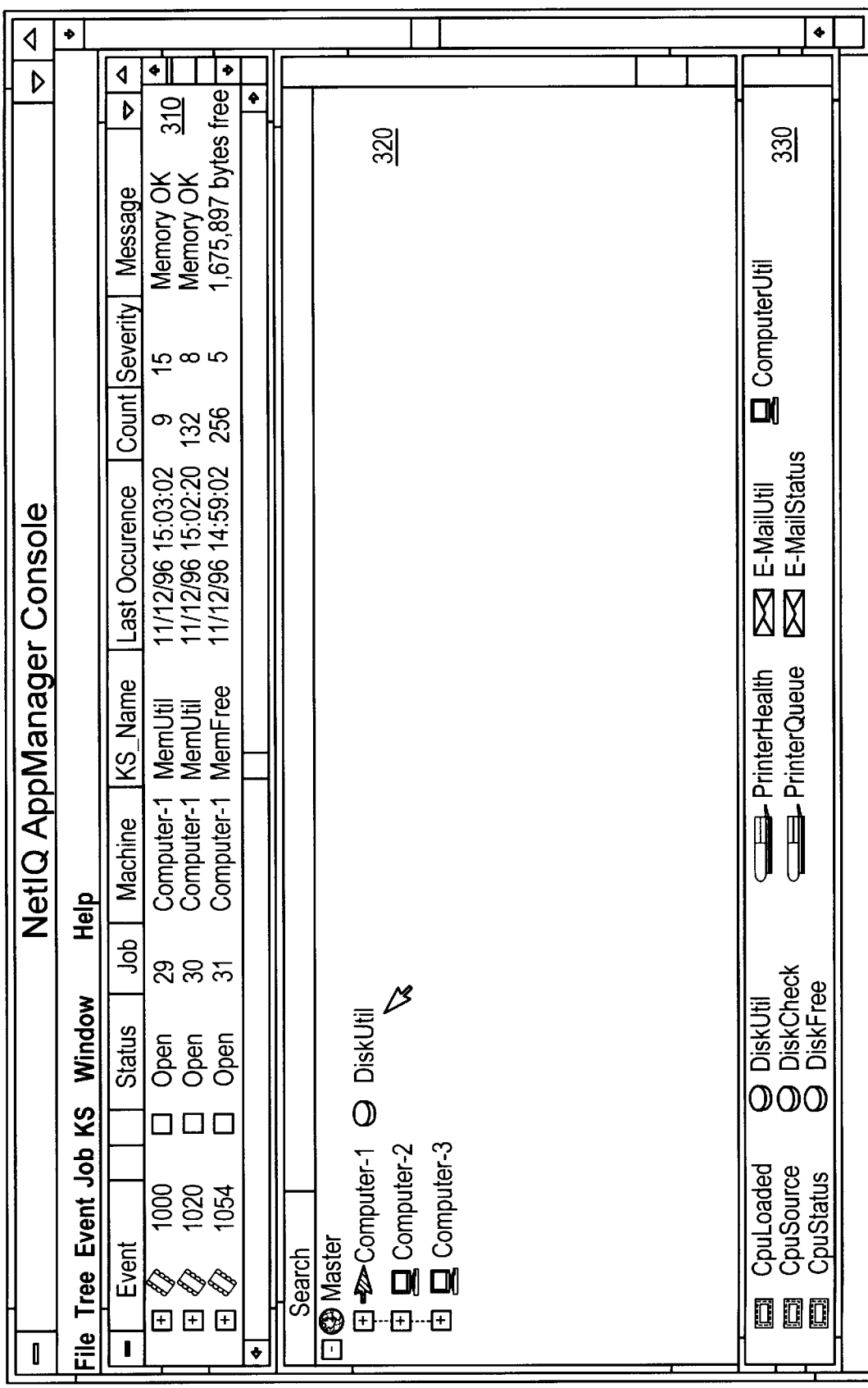

FIGS. 3I–3J illustrate an operation equivalent to the operation of FIG. 3C in manipulating disk C:, disk D: and disk E:, except that the resource object tree of tree-view pane 320 is folded.

Figures 4A, 4B:
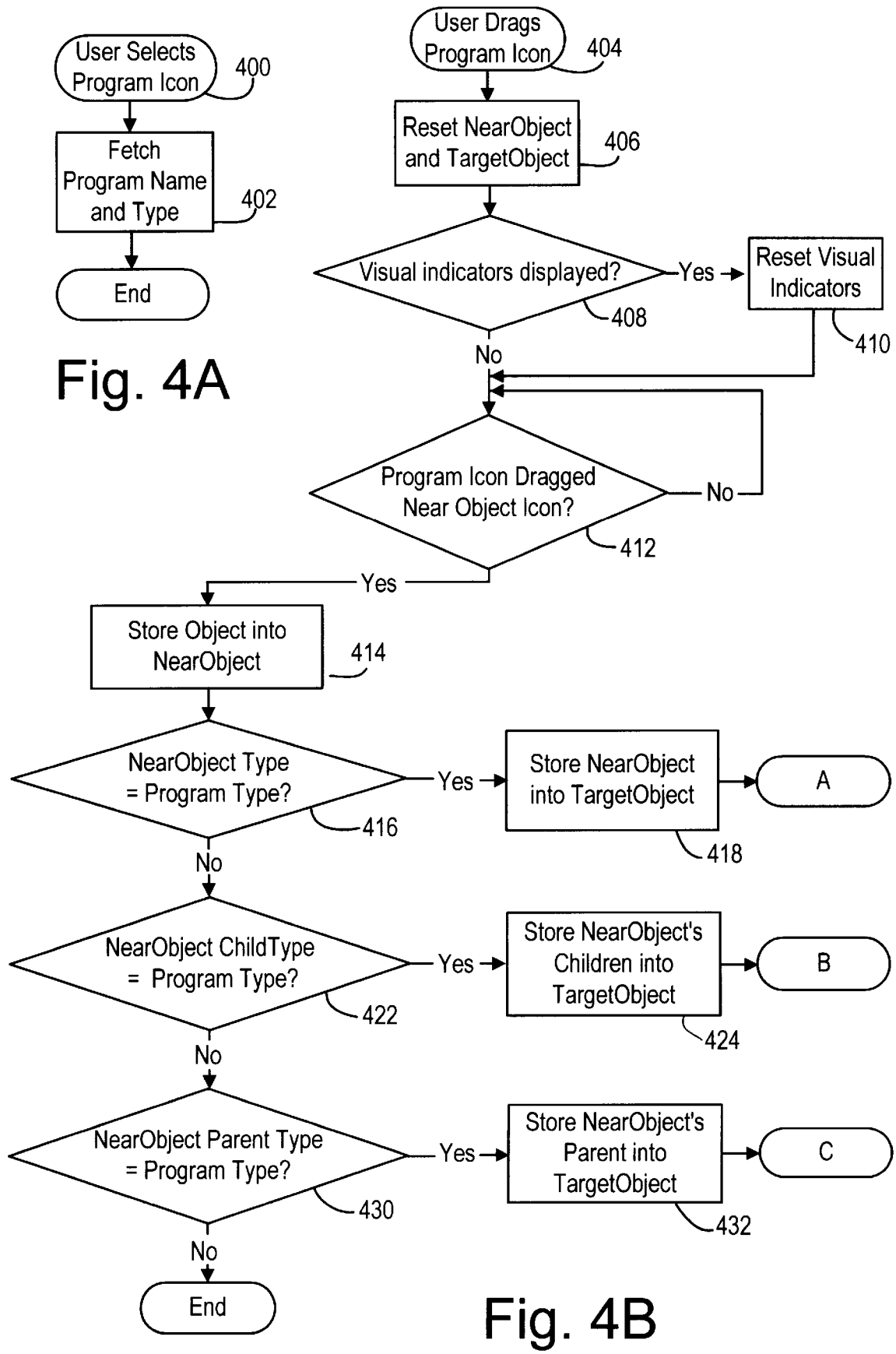
FIGS. 4A–4D are flow diagrams of an operation according to one embodiment of the invention.
Figure 4:
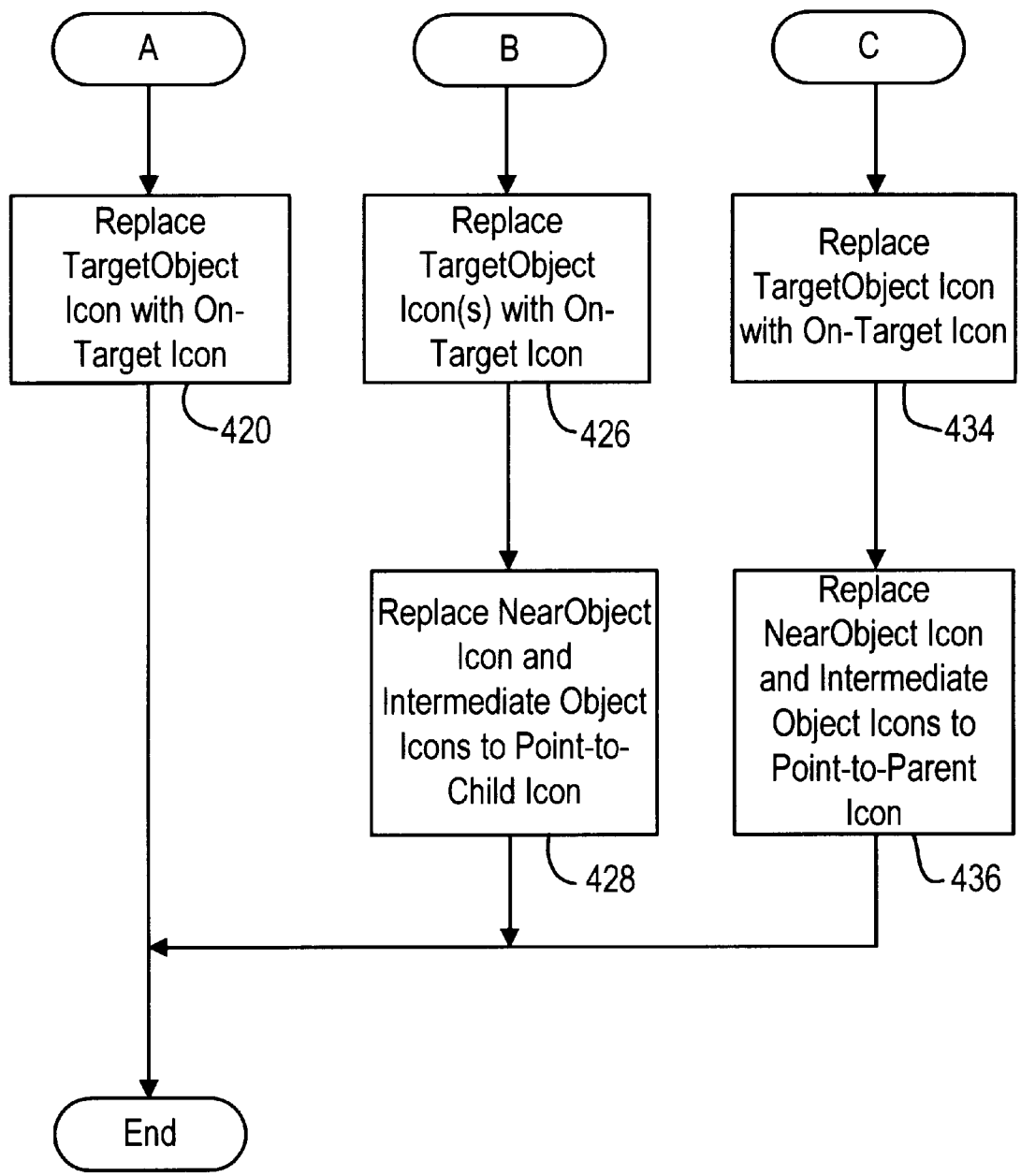
Figure 4:
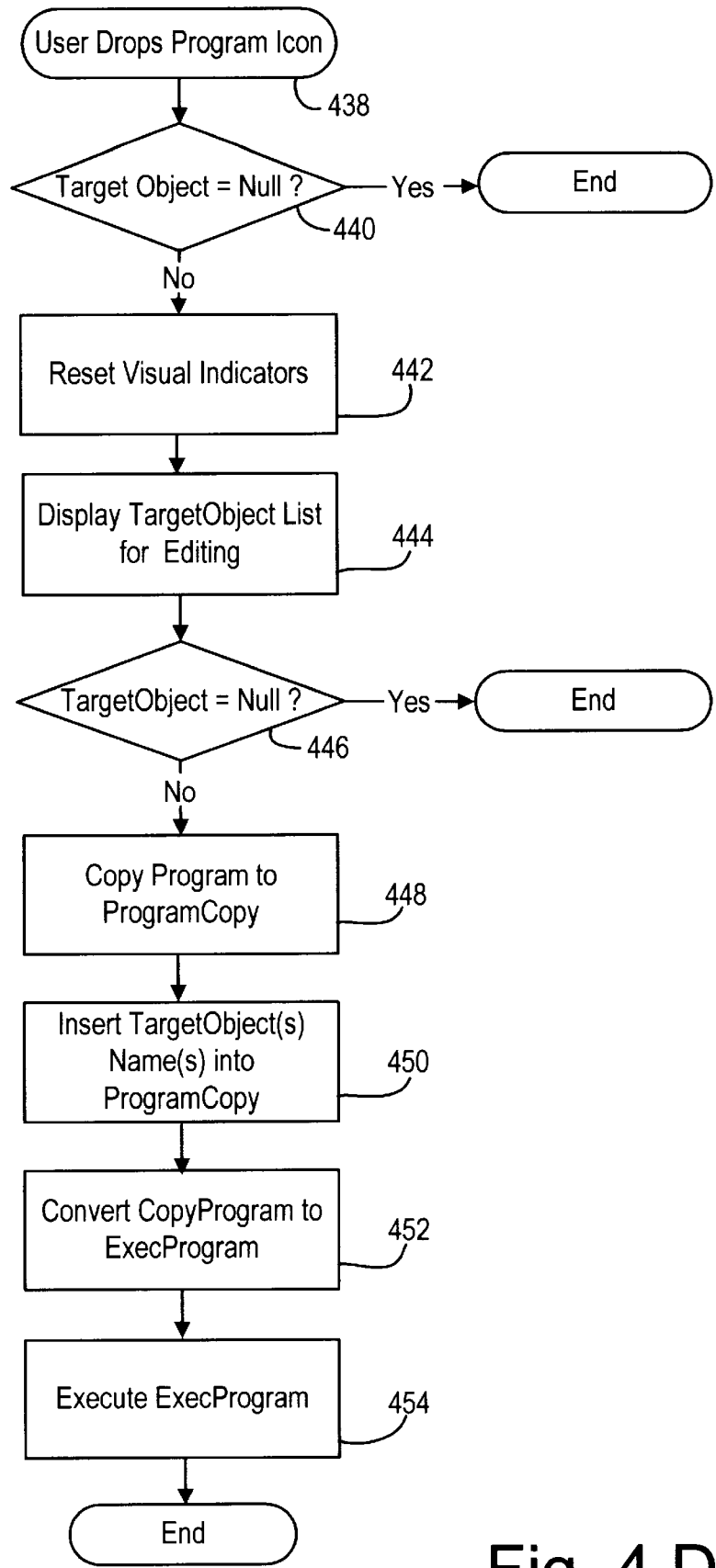

The operations of FIGS. 3A–3J are more formally described by the flow diagram of FIGS. 4A–4D. FIG. 4A illustrates the operation of selecting a program icon from program pane 330 (FIG. 3A) in stage 400. After the program icon is selected, the program name and type are extracted in stage 402 to be later used in determining whether the program can manipulate resource objects represented by the icons displayed in tree-view pane 320 and the selection operation terminates.

FIGS. 4B–4C illustrate the operation of dragging the program icon near a resource object icon or away from a previously selected resource object icon. In stage 404, the user first drags the program icon selected by the operation of FIG. 4A. A NearObject variable and a TargetObject variable are then reset. The NearObject and TargetObject variables are used as temporary storage during a drag operation. Any method of temporarily storing resource object information known in the art can be used to store the values of the variables. As those skilled in the art are familiar with these methods, they are not further discussed herein.

Stage 408 then checks whether any visual indicators are displayed in tree-view pane 320 (FIG. 3A), possibly resulting from a previous drag operation. If any visual indicators are displayed, the visual indicators are reset (i.e. replaced with the original resource object icons) in stage 410, otherwise the operation proceeds to stage 412. Stage 412 determines whether the program icon is dragged near a resource object icon. If the program icon is dragged near a resource object icon, as shown in FIGS. 3A, the value of the resource object of the resource object icon is stored in the NearObject variable in stage 414, otherwise stage 412 is repeated. Next, stage 416 determines whether the program type, extracted in the selection operation of FIG. 4A, is the same as a type of the resource object stored in the NearObject variable. If a type of the NearObject is the same as the program type, the value of the NearObject variable is stored in the TargetObject variable in stage 418, otherwise the operation proceeds to stage 422. After the value is stored in the TargetObject variable, the icon of the resource object stored in the TargetObject variable is replaced by the On-Target icon in stage 420 to indicate that the program can manipulate the resource object and the operation terminates, as shown in FIGS. 3B and 3F.

Next, stage 422 determines whether one or more child resource objects of the resource object stored in the NearObject variable have the same type as the program type. If any of the child resource objects have the same type as the program type, the values of all the child resource objects are stored in the TargetObject variable in stage 424, otherwise the operation proceeds to stage 430. The TargetObject variable can store multiple resource object values. Any technique known in the art for storing multiple values in a variable can be used to store the child resource object values in the TargetObject variable. As these techniques are known to those skilled in the art, they are not further discussed herein. After the child resource object values are stored in the TargetObject variable, the icons of the resource objects stored in the TargetObject variable are replaced by the On-Target icon in stage 426, the icons of the NearObject and of all icons displayed in the foldable tree between the NearObject icon and the TargetObject icons are replaced by the Point-to-Child icon in stage 428 and the operation terminates, as shown in FIG. 3C.

Next, stage 430 determines whether a parent resource object of the resource object stored in the NearObject variable has the same type as the program type. If any parent resource object has the same type as the program type, the value of the parent resource object is stored in the TargetObject variable in stage 432, otherwise the operation terminates. After the value of the parent resource object is stored, the icon of the resource object stored in the TargetObject variable is replaced by the On-Target icon in stage 434, the icons of the NearObject and of all icons displayed in the foldable tree between the NearObject icon and the Targetobject icon are replaced by the Point-to-Parent icon in stage 436 and the operation terminates, as shown in FIG. 3E.

In some embodiments, part of the tree is not visible because one or more nodes are folded. In these embodiments, if the program icon selected in the operation of FIG. 4A is dragged near an icon of a resource object whose children have the same type as the program type, the operation of FIGS. 4B–4C is performed as if the tree were not folded, but the invisible child icons are not displayed. Accordingly, the resource object icon is replaced by the Point-to-Child icon and the child resource object values are copied into the TargetObject variable.

FIG. 4D illustrates the operation of inserting references to resource objects into a program and executing the program when the program icon is dropped on the resource object icon. In stage 438, a user drops the program icon selected in the operation of FIG. 4A by releasing the cursor-control device button. Stage 440 then determines whether the TargetObject variable contains one or more resource object values. If the TargetObject variable does not contain any resource object values, the operation terminates, otherwise (i.e. if one or more resource objects that can be manipulated by the program were selected in the operation of FIGS. 4B–4C) any visual indicators set during the operation of FIGS. 4B–4C are reset in stage 442. A list of the resource object values stored in the TargetObject variable is displayed to the user in stage 444. The user has then the option of deleting any resource objects from the list, preventing them from being referenced to in the program. Any suitable technique known in the art can be used to allow the user to select from the list. As these techniques are known to those skilled in the art, they are not further discussed herein. Stage 446 then determines whether there are any values left in the TargetObject variable after editing by the user. If no resource object values are stored in the TargetObject variable, the operation terminates. In some embodiments, stages 444 and 446 are dispensed with altogether.

Next, in stage 448 a copy CopyProgram of the program is generated. In stage 450, a reference to all resource objects whose values are stored in the TargetObject variable is inserted in the CopyProgram. In stage 452, the CopyProgram is converted to an executable program ExecProgram. Finally, in stage 454 the ExecProgram is executed on the computer system and the operation terminates.

Figure 5:
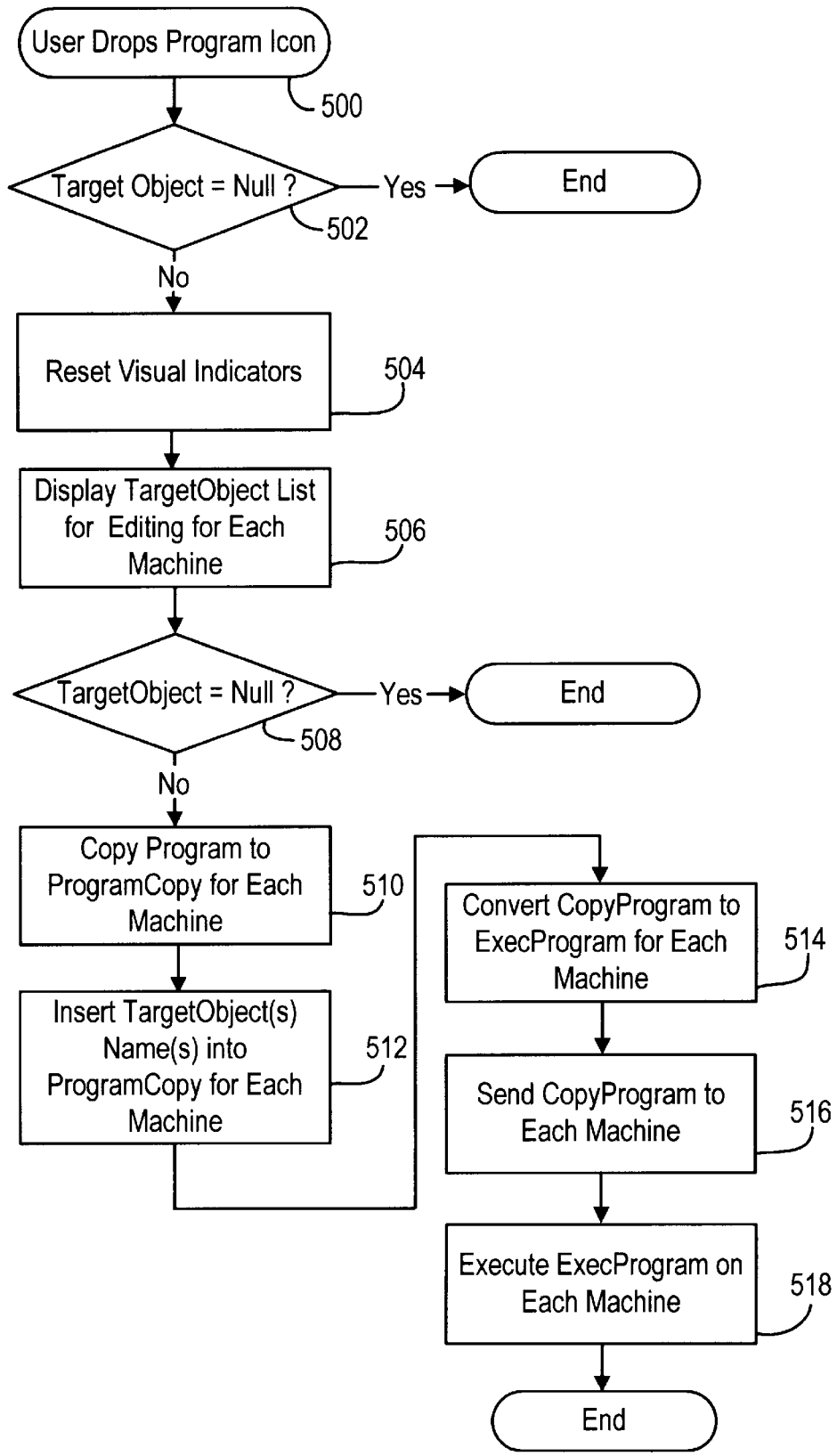
FIGS. 5 is a flow diagram of the operation of FIG. 4D as modified to handle a distributed system.
Figure 6:
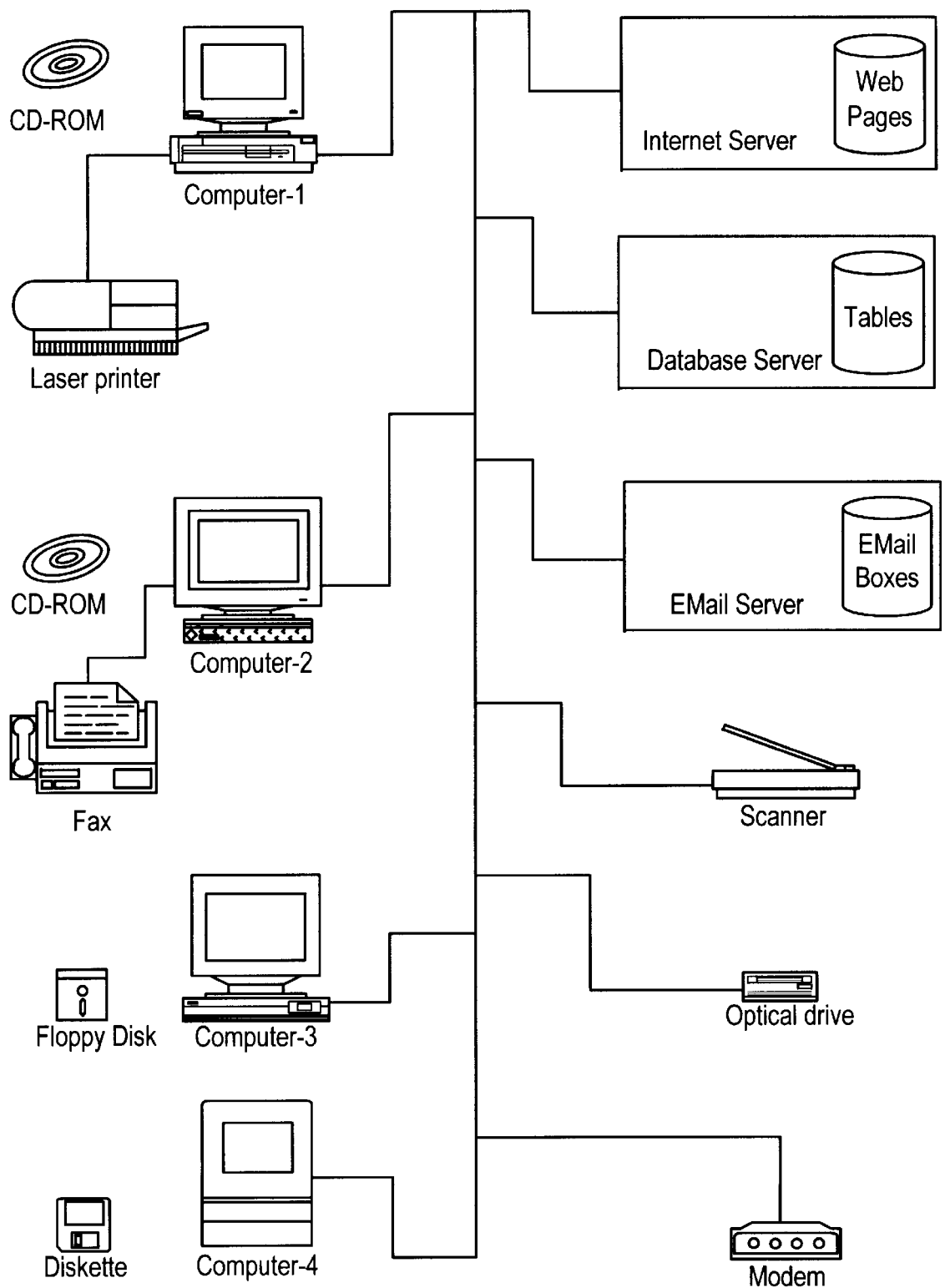
FIG. 6 illustrates a distributed computer system according to one embodiment of the invention.

FIG. 5 illustrates the operation of FIG. 4D as modified to handle a distributed system. In a distributed system, multiple executable copies of the program selected in the operation of FIG. 4A are generated when multiple resource objects belonging to different machines are selected during the operation of FIGS. 4B–4C. Accordingly, the following describes the operation of FIG. 4B, as modified to generate multiple executable programs when a user drops the program icon.

Stages 500–504 are analogous to stages 438–442 of FIG. 4D. In stage 506, for each machine a separate list of the resource object values stored in the TargetObject variable is displayed to the user. The user has then the option of deleting any resource objects from any of the list, preventing them from being referenced to in the programs. Stage 508 is analogous to stage 446 of FIG. 4B. In some embodiments, stages 506–508 can be dispensed with altogether.

Next, in stage 510 a copy CopyProgram of the program is generated for each machine that has a resource object whose value is stored in the TargetObject variable. In stage 512, a reference to all resource objects of a machine whose values are stored in the TargetObject variable is inserted in a CopyProgram for the appropriate machine. In stage 514, the CopyPrograms are converted to executable programs ExecPrograms. The ExecPrograms are then sent to the machines having the resource objects referenced in their respective CopyPrograms. Finally, in stage 516 the ExecPrograms are executed on the machines and the operation terminates. In some embodiments, CopyPrograms are first sent to their respective machines and then converted and executed locally.

The method of the preferred embodiment of the invention can be used as part of a system management system. A system management system is a system which allows an operator, or even a lay user, to monitor and maintain a computer system. For example, a management system allows the operator to check the amount of disk space available on the disk drives connected to the system and take appropriate action when the amount of disk space is limited (e.g. send a message to the users to delete unnecessary files, or launching a program designed specifically to correct the problem). The system also monitors the various subsystems such as database servers, e-mail servers, network servers, etc. and keeps statistics of the performance of each of the subsystems.

Figure 8:
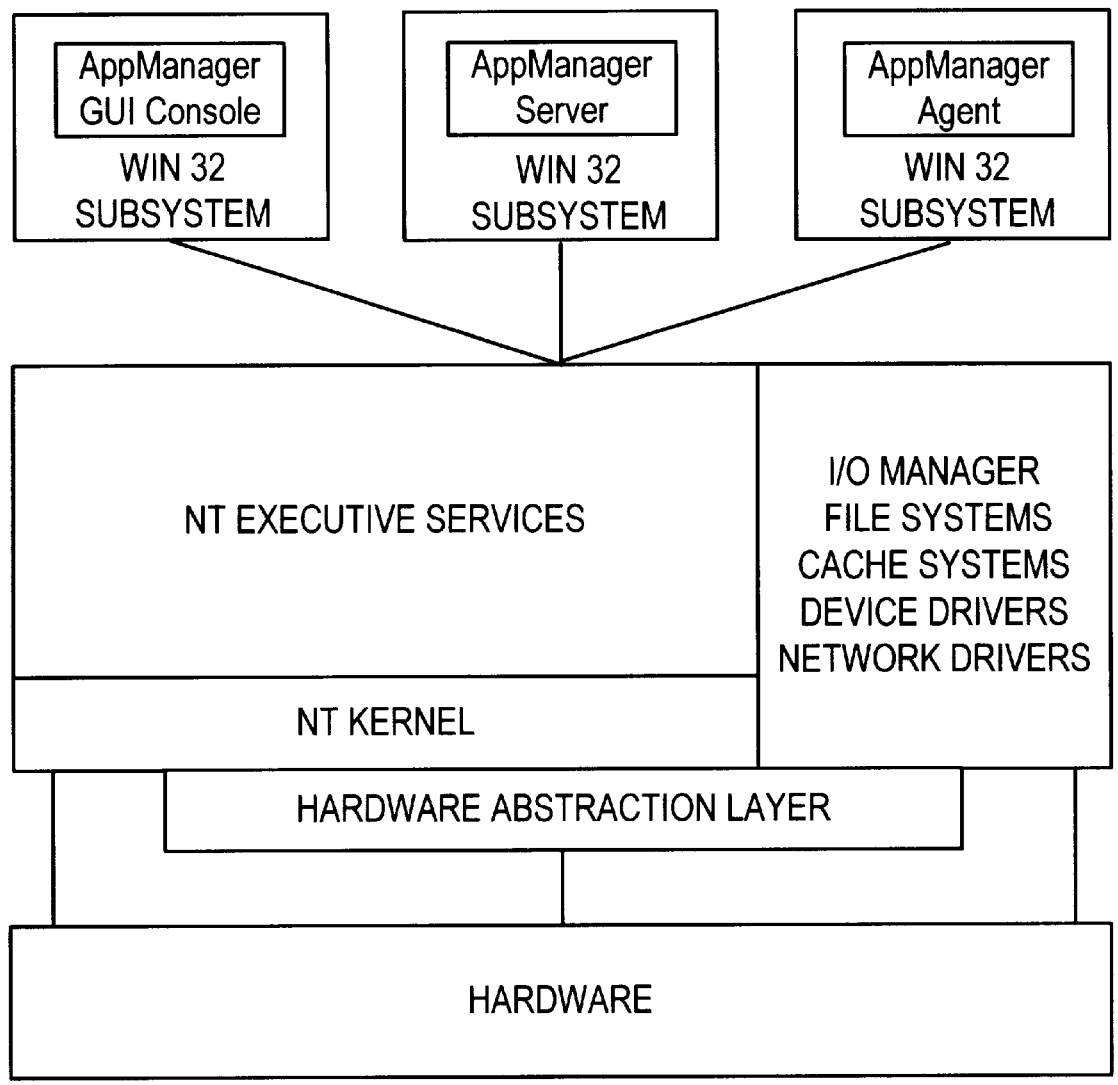
FIG. 8 is a block diagram of an operating system according to one embodiment of the invention.

A system management system according to the preferred embodiment of the invention can be implemented as an application program on a distributed system running under the Windows NT® operating system, as shown in FIG. 8. For example, such a system management system allows the operator to manage computer resources, database servers, e-mail servers, internet servers, etc. distributed on multiple machines running the Windows NT® operating system. FIG. 8 illustrates the structure of the Windows NT® operating system. AppManager™, a system management system which embodies the principles of the preferred embodiment of the invention, is implemented as three types of application programs, AppManager™ GUI Console, AppManager™ Server and AppManager™ Agent running under the Win32 subsystem of the Windows NT® operating. The AppManager™ GUI Console is a program that runs on the system administrator console and allows the system administrator to centrally define and control the execution of all programs, as described in the present application. The AppManager™ Server is a program that runs on a Windows NT® server that manages the communications between the AppManager™ GUI and the AppManager™ Agents. The AppManager™ Agents are application programs that run on any Windows NT® server or workstation that receive request from the AppManager™ GUI Console to run programs, as described in the present application. All AppManager™ products are available from NetIQ, Corp. of Santa Clara, Calif.

Embodiments described above illustrate but do not limit the invention. In particular, the invention is not limited by any particular icons used to indicate that a program can manipulate a resource object, or a parent, or one or more children of the resource object. Different shapes or colors of visual indicators can be used for the On-Target, Point-to-Child and Point-to-Parent icons. Further, different computer hardware may be utilized. For example, instead of using a mouse for drag and drop operations, a keyboard, a trackball, or any other suitable device may be used to control the cursor. Other embodiments and variations are within the scope of the invention, as defined by the following claims.

We claim:

1. A method for enabling a user to select and manipulate resource objects using a graphical user interface of a computer system, the method comprising:

controlling a cursor control device of the computer system to drag a program icon corresponding to a program stored on the computer system onto a resource object icon corresponding to a parent resource object of the computer system, the program icon and the parent resource object icon being displayed by the graphical user interface of the computer system, wherein the parent resource object icon is part of a plurality or resource object icons arranged in a tree topology and each resource object icon corresponds to a resource object;

determining a type of the program;

determining a type of the parent resource object;

determining a type of a first child resource object corresponding to a first child resource object icon of the parent resource object icon;

determining a type of a second child resource object corresponding to a second child resource object icon of the parent resource object icon;

comparing the type of the program to the type of the parent, the first or the second child resource objects to determine whether the program can manipulate the parent, the first or the second child resource objects;

upon determining by said comparing that the program can manipulate the first or the second child resource objects, modifying a visual display of the parent, the first or the second child resource object icons to indicate to a user that the program can manipulate the first or the second child resource objects, wherein the modification of the visual display of the parent resource object icon is different from the modification of the visual display of the first or the second resource object icons; and upon the user electing to manipulate the first or the second child resource objects via the program, executing the program on the first or the second child resource objects.

2. The method of claim 1, wherein the first child resource object is part of a first computer and the second child resource object is part of a second computer and the first and the second computers are connected via a network, the method further comprising:

creating a first or a second copy of the program, executing the first copy of the program on the first computer; or executing the second copy of the program on the second computer.

3. The method of claim 2, wherein the parent, the first and the second child resource objects each further comprise a list of parent resource object types and a list of child resource object types.

4. The method of claim 3, wherein the list of parent resource object types of the first or the second child resource objects includes the type of the parent resource object and the list of child resource object types of the parent resource object includes the type of the first or the second child resource objects.

5. The method of claim 2, wherein the first copy of the program includes a reference to the first resource object.

6. The method of claim 2, wherein the second copy of the program includes a reference to the second resource object.

7. A method for enabling a user to select and manipulate resource objects using a graphical user interface of a computer system, the method comprising:

controlling a cursor control device of the computer system to drag a program icon corresponding to a program stored on the computer system onto a resource object icon corresponding to a parent resource object of the computer system, the program icon and the parent resource object icon being displayed by the graphical user interface of the computer system, wherein the parent resource object icon is part of a plurality or resource object icons arranged in a tree topology and each resource object icon corresponds to a resource object;

determining a type of the program;

determining a type of the parent resource object;

determining a type of a child resource object corresponding to a child resource object icon of the parent resource object icon;

comparing the type of the program to the type of the parent and the child resource objects to determine whether the program can manipulate the parent and the child resource objects;

upon determining by said comparing that the program can manipulate the child resource object, modifying a visual display of the parent resource object icon and the child resource object icon to indicate to a user that the program can manipulate the child resource object, wherein the modification of the visual display of the parent resource object icon is different from the modification of the visual display of the child resource object icon; and upon the user electing to manipulate the child resource object via the program, executing the program on the child resource object.

8. The method of claim 7, wherein the parent and the child resource objects each further comprise a list of parent resource object types and a list of child resource object types.

9. The method of claim 8, wherein the list of parent resource object types of the child resource object includes the type of the parent resource object and the list of child resource object types of the parent resource object includes the type of the child resource object.

10. A computer-readable storage medium storing software executable by a computer system, the software including instructions for:

controlling a cursor control device of the computer system to drag a program icon corresponding to a program stored on the computer system onto a resource object icon corresponding to a parent resource object of the computer system, the program icon and the parent resource object icon being displayed by the graphical user interface of the computer system, wherein the parent resource object icon is part of a plurality or resource object icons arranged in a tree topology and each resource object icon corresponds to a resource object;

determining a type of the program;

determining a type of the parent resource object;

determining a type of a first child resource object corresponding to a first child resource object icon of the parent resource object icon;

determining a type of a second child resource object corresponding to a second child resource object icon of the parent resource object icon;

comparing the type of the program to the type of the parent, the first or the second child resource objects to determine whether the program can manipulate the parent, the first or the second child resource objects;

upon determining by said comparing that the program can manipulate the first or the second child resource objects, modifying a visual display of the parent, the first or the second child resource object icons to indicate to a user that the program can manipulate the first or the second child resource objects, wherein the modification of the visual display of the parent resource object icon is different from the modification of the visual display of the first or the second resource object icons; and upon the user electing to manipulate the first or the second child resource objects via the program, executing the program on the first or the second child resource objects.

11. The computer-readable storage medium of claim 10, wherein the first child resource object is part of a first computer and the second child resource object is part of a second computer and the first and the second computers are connected via a network, the method further comprising:

creating a first or a second copy of the program, executing the first copy of the program on the first computer; or executing the second copy of the program on the second computer.

12. The computer-readable medium of claim 11, wherein the first copy of the program includes a reference to the first resource object.

13. The computer-readable medium of claim 11, wherein the second copy of the program includes a reference to the second resource object.

14. The computer-readable medium of claim 10, wherein the parent, the first and the second child resource objects each further comprise a list of parent resource object types and a list of child resource object types.

15. The computer-readable medium of claim 14, wherein the list of parent resource object types of the first or the second child resource objects includes the type of the parent resource object and the list of child resource object types of the parent resource object includes the type of the first or the second child resource objects.

16. A computer-readable storage medium storing software executable by a computer system, the software including instructions for:

controlling a cursor control device of the computer system to drag a program icon corresponding to a program stored on the computer system onto a resource object icon corresponding to a parent resource object of the computer system, the program icon and the parent resource object icon being displayed by the graphical user interface of the computer system, wherein the parent resource object icon is part of a plurality or resource object icons arranged in a tree topology and each resource object icon corresponds to a resource object;

determining a type of the program;

determining a type of the parent resource object;

determining a type of a child resource object corresponding to a child icon of the parent resource object icon;

comparing the type of the program to the type of the parent and the child resource objects to determine whether the program can manipulate the parent and the child resource objects;

upon determining by said comparing that the program can manipulate the child resource object, modifying a visual display of the parent resource object icon and the child resource object icon to indicate to a user that the program can manipulate the child resource object object, wherein the modification of the visual display of the parent resource object icon is different from the modification of the visual display of the child resource object icon; and upon the user electing to manipulate the child resource object via the program, executing the program on the child resource objects.

17. The computer-readable medium of claim 16, wherein the parent and the child resource objects each further comprise a list of parent resource object types and a list of child resource object types.

18. The computer-readable medium of claim 17, wherein the list of parent resource object types of the child resource object includes the type of the parent resource object and the list of child resource object types of the parent resource object includes the type of the child resource object.

* * * * *